3,451,963
POLYMERIZATION OF LACTAMS

Paul A. Tierney, Ballwin, and Ross M. Hedrick, St. Louis, Mo., assignors to Monsanto Company, St. Louis, Mo., a corporation of Delaware
No Drawing. Filed Nov. 15, 1965, Ser. No. 507,682
Int. Cl. C08g *20/10, 20/12, 51/04*
U.S. Cl. 260—37        18 Claims

ABSTRACT OF THE DISCLOSURE

An improved base-catalyzed, initiated, substantially anhydrous anionic polymerization process for lactams comprising forming an N-halometallic lactam catalyst by reacting a metal lactam with a metal halide and catalyzing the polymerization of the monomeric lactam with the N-halometallic lactam.

---

This invention relates to the polymerization of lactams. One principal aspect of this invention relates to the base-catalyzed, substantially anhydrous polymerization of lactams to form polyamides. Another related aspect of the present invention relates to an improved process for preparing filled and reinforced polylactams.

U.S. Patents 3,017,391 and 3,017,392 describe a process for polymerizing lactams using as a catalyst precursor a substance capable of forming an iminium salt upon reaction with the monomeric lactam, e.g.

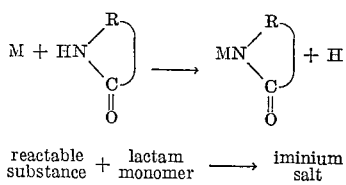

reactable substance + lactam monomer ⟶ iminium salt

The iminium salt is the active catalyst of the lactam polymerization system. The patents mentioned above set forth the use of several reactable substances which form iminium salts upon reaction with the lactam monomer. Some of the iminium salts suggested are the alkali metal lactams such as lithium, sodium and potassium lactams, the alkaline earth metal lactams such as magnesium, calcium, strontium and barium lactams, zinc lactam and aluminum lactam.

More recently in copending U.S. patent application Ser. No. 284,375, filed May 31, 1963, techniques for preparing reinforced polyamides are discussed. The reinforcing action is achieved by chemically bonding a reinforcing adduct to the polymer molecules. The adduct consists of an inorganic material combined with a coupling agent. A coupling agent is defined as a polyfunctional compound having at least one functional group capable of reacting with hydroxyl groups, i.e. with the surface of most inorganic materials, and at least one functional group capable of chemically reacting with a polymerized polymer or a polymerizing monomer. As mentioned in the above patent application, the catalyst systems set forth in U.S. 3,017,391 and U.S. 3,017,392 also catalyze a slurry of lactam monomer and reinforcing adduct. The properties of the finished products are, as reported, quite satisfactory.

Larger scale production of filled and reinforced polylactams outside the laboratory has resulted in problems not readily discernable or non-existent on a laboratory scale. For instance, the use of ethylmagnesium bromide as a polymerization catalyst provides a gaseous by-product, ethane, which must be removed from the polymerization slurry prior to its solidification. Entrapment of the gas within the slurry produces unattractive finished products with blisters and pits on their surfaces. In the laboratory, the problem is overcome by holding the catalyzed slurry at reduced temperatures to prevent polymerization and removing the ethane by distillation at reduced pressure. In the plant, such an operation on large quantities of slurry is expensive and time-consuming.

The alkali metal lactams, such as sodium and potassium caprolactams, cause no evolution of gases when used as lactam poylmerization catalysts. Finished compositions prepared using alkali metal lactam catalysts, however, exhibit a yellowish cast. Further, the active nature of the catalyst makes thorough distribution throughout the monomer slurry prior to polymerization a difficult task. In the laboratory, adequate mixing can be achieved by vigorous stirring at reduced temperatures. In the plant, stirring necessary to distribute the catalyst throughout the monomer slurry followed by rapid heating to polymerization temperatures represents another expensive operation. The addition of a filler or reinforcing agent to the monomer slurry increases the problem of adequate mixing.

Other metal lactam polymerization catalysts can be used which will not impart a yellowish tint to the finished polymer and will not evolve gaseous reaction products. Unfortunately, many of these catalysts are also relatively inefficient, requiring longer polymerization times to produce finished objects. A process burdened with a lengthy polymerization cycle requires a greater investment in casting molds and auxiliary equipment than does a similar process utilizing a shorter polymerization cycle. Magnesium caprolactam is an example of a catalyst which produces acceptable polymerized objects by means of a lengthy casting cycle.

In view of the foregoing process difficulties, it would be highly advantageous to devise a rapid process for polymerizing lactams, resulting in a finished product having a good appearance and good mechanical properties. It would be additionally advantageous if the above process were suitable for the casting of a monomeric lactam into a finished polymeric shape. It would also be advantageous if the above process were capable of efficient large-scale polymerization of lactams. Providing the above advantages constitutes the principal objects of this invention. Additional objects, benefits and advantages will become apparent in view of the following detailed description.

The present invention is an improvement in the base-catalyzed, substantially anhydrous, anionic polymerization of lactams. The improvement comprises forming an N-halometallic lactam catalyst by reacting a source of halogen with a metal lactam, and catalyzing the polymerization of a monomeric lactam with said N-halometallic lactam.

Lactams which can be polymerized by the practice of the present invention have the following structural formula:

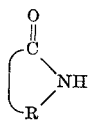

where R is an alkylene group having at least three carbon atoms, and preferably from about 5 to about 11 carbon atoms. A particularly preferred lactam is ε-caprolactam. Other suitable lactams include α-pyrrolidone, piperidone, valerolactam, caprolactams other than the ε-isomer, enantholactam, caprylolactam, nonanolactam, caprylactam and dodecanolactam.

The base-catalyzed, substantially anhydrous polymerization of lactams is well-known to those skilled in the art. The patent art contains several disclosures relating to base-catalyzed lactam polymerizations. Among them are U.S. 3,017,391, U.S. 3,017,392, U.S. 3,018,273, U.S. 3,028,369, U.S. 3,086,962 and U.S. 3,120,503. The above references disclose various initiators, regulators and reaction conditions for carrying out a base-catalyzed lactam polymerization. In general, the reaction components and reaction conditions described in the above patents are as equally suitable for the catalyst system described herein as they are for the catalyst systems set forth in the above patents.

The metal lactam can be any metal lactam. But metal lactams containing metals more electropositive than magnesium can be made to perform satisfactorily as lactam polymerization catalysts without the additional source of halogen. Since the basis of the present invention is the conversion of relatively slow, inefficient lactam polymerization catalysts into fast, efficient catalysts, the metals used to form the metal lactams included within the scope of the present invention are preferably magnesium and those metals less electropositive than magnesium. Those skilled in the art of base-catalyzed lactam polymerizations nevertheless realize that metal lactams such as sodium or potassium caprolactam will vary in their catalytic activity, depending upon factors such as the anhydrous condition of the metal lactam. In instances where the normally active metal lactams (containing metal more electropositive than magnesium) do not perform satisfactorily as polymerization catalysts, they also can be converted into fast polymerization catalysts by the use of halogenated compounds in a manner similar to that subsequently described for the other metal lactams. The lactam component of the metal lactam can be any lactam. Oftentimes the lactam component will be identical to the particular monomer being polymerized, but such a restriction is by no means essential. Concentrations of metal lactam are conveniently expressed in terms of millimoles per mole of monomer. Workable concentrations can range from 0.1 millimole per mole of monomer or less up to 200 millimoles per mole of monomer or more. If the source of halogen is ample, a preferred range is from about 1 to about 50, more preferably from about 5 to about 30, millimoles of metal lactam per mole of polymerizable lactam monomer.

The metal lactam can be prepared prior to addition to the monomer or it can be formed in situ by introducing a metal hydride, hydroxide, alkyl, or alkoxide directly into the monomer slurry. Depending upon the degree of reactivity of the specific metal compound with the lactam monomer, it may be advantageous to use either pre-reaction or in situ formation of the metal lactam. To prepare a metal lactam, the metal compound is dispersed in a molten lactam or a lactam dissolved in a suitable solvent. The hydrogen, hydroxide, alkyl or alkoxy group of the metal compound is displaced by the lactam and driven off. If a metal alkyl or alkoxide is employed, the alkyl or alkoxy group can be of any size or degree of branching although relatively straight-chained groups having up to about 20 carbon atoms are preferred.

The choice of which metal compound to react with a lactam will depend to some extent upon the reaction conditions. For instance, a magnesium alkyl can be added directly to a lactam monomer to form quickly the corresponding magnesium lactam. A magnesium alkoxide can be expected to react more slowly. An aluminum alkoxide, however, reacts so slowly that the use of an aluminum alkyl to form the aluminum lactam is definitely preferred. Similarly, the reaction of most metals other than magnesium or aluminum with a lactam will benefit from the use of metal alkyls or hydrides to produce a satisfactory quantity of the metal lactam. Reaction temperatures can vary from room temperature or less up to 200° C. or more and pressures from subatmospheric to several hundred pounds per square inch. As previously explained, reaction times can also vary considerably from a few seconds to several hours.

Any metal halide can be used as a source of halogen in the present invention. Examples include the alkali metal halides such as sodium chloride and potassium bromide, the alkaline earth metal halides such as magnesium iodide, calcium chloride and barium fluoride, and other metal halides such as aluminum chloride, titanium bromide, antimony trichloride, gallium trichloride, bismuth trichloride, molybdenum tetrachloride, chromic chloride, manganese bromide, ferric iodide, nickel fluoride, cupric bromide, zinc fluoride, stannous and stannic chlorides and lead chloride. It should be noted that preparation of polylactams using certain metal halides can result in significant coloration of the polymer. If an uncolored product is a desirable feature, it will be necessary to restrict the choice of metal halide to those compounds which impart no unwanted color to the finished product. Other considerations will also influence the selection of metal halide. For instance, polymerization time can be affected by the metal halide. One way of achieving exceptionally fast polymerization times is to choose a metal halide wherein the metal is no more electropositive than the metallic component of the metal lactam. The electropositive nature of a metal is expressed as the single electrode potential present at the negative pole of a cell having an electrolyte consisting of a solution of the metal ions. The higher the electrode potential, the more electropositive is the metal. Examples of preferred combinations of metal halide and metal lactam include magnesium caprolactam with magnesium bromide, aluminum chloride, zinc iodide or calcium fluoride; aluminum caprolactam with aluminum chloride, magnesium iodide or zinc fluoride; and silver pyrrolidone with ferric bromide, nickel bromide or cupric iodide.

Certain organic halides can also function as acceptable sources of halogen. Those labile, organic halides having halogen atoms attached to carbon atoms which are not nuclear carbon atoms in an aromatic ring are preferred for use herein if the halide has a boiling point above about 150° C. Examples include benzoyl chloride, benzoyl bromide, benzal chloride, benzal iodide, benzal chloride, 1,4-dichlorobutadiene, 1,4-dichloroisoprene and 1,4-dichlorobutane. Other organic halides can also be used herein. Chloroform, for instance, can be used if metal lactam and chloroform are both mixed into the monomer just prior to casting. It should also be recognized that certain aromatic halides where the halogen is attached directly to the aromatic ring will also perform satisfactorily if other groups attached to the aromatic ring are of such a nature as to cause the halogen atoms to be available for reaction with a metal lactam. That is, aromatic halides which are as labile as aliphatic halides are also useful. Suitable concentrations of the halogenated compound can be conveniently expressed in the same manner as that used to describe metal lactam or alkoxide concentration—millimoles per mole of monomer. Useful concentration ranges are comparable to the ranges specified for the metal lactam—from 0.1 or less up to 200 or more, preferably from about 1 to about 50, millimoles of halogenated compound per mole of lactam monomer. When a preferred concentration of metal lactam is used, it is often desirable to use an approximately equal molar quantity of halogenated compound, the mole ratio of halogenated compound to metal lactam being from about 0.75 to 1 up to 2 or 3 to 1.

The reaction of a metal lactam with a source of halogen yields an acceptable catalyst. The reaction of the catalyst components can be conducted separately although some of the principal advantages of this invention stem from the fact that the active catalyst can be formed in the presence of the monomeric lactam slurry, thereby providing better distribution of catalyst throughout the monomer slurry. One satisfactory technique comprises mixing molten monomer, reinforcing agent, if used, initiator, regulator and halogen source and holding the resultant slurry at or near polymerization temperature for an indefinite time. When polymerization is desired, the slowacting catalyst is added to the slurry and the slurry polymerized. Problems of degassing at reduced temperature followed by rapid heating to polymerization temperature are obviated. Also eliminated is the problem of a yellowed polymer.

Other techniques of combining the metal lactam and halogen source include their simultaneous addition to an initiated slurry followed by addition of an initiator and casting. Or the halogenated compound and metal lactam could be mixed together before addition to the slurry. The metal lactam could also be added before the halogenated compound.

Another important feature of the instant invention when the metal lactam is added just prior to casting with a minimum of mixing is the opportunity to use a liquid solution of metal lactam. Grignard reagents such as ethylmagnesium bromide can be dissolved in ether to provide a catalyst solution. But the solution is dilute, necessitating the removal of considerable quantities of ether in addition to the ethane byproduct from the reaction mixture of Grignard with lactam monomer. Metal lactams can be dissolved in N,N-dihydrocarbyl amides to provide a liquid solution for dispersing in the monomeric lactam slurry. The hydrocarbyl groups can be any monovalent hydrocarbon group having any number of carbon atoms. Preferred are alkyl and aryl groups having up to about 20 carbon atoms. The solvent need not be a liquid at room temperature. It is sufficient if it is a liquid at some elevated temperature as high as 150 or 200° C. or higher. Examples of acceptable solvents include N-methylformanilide, N-ethylacetanilide, N-ethyl-4-nitroacetanilide, N-n-butylacetanilide, N-methyl-o-acetotoluidide, N,N'-p-phenylenebisacetanilide, 2-chloro-N-ethylacetanilide, N,N-diphenylacetamide, N,N-diphenylformamide, N,N-diethylformamide, N-methyl, N-1-naphthylacetamide, N,N-di-n-butylacetamide, N,N-di-isopropylpropionamide, N-butyl-N-octyldecanamide, N,N-dimethylbenzamide, N,N-diethyl-p-toluamide, N-methyl-pyrrolidone, N-octylpiperiodone, N-phenyl caprolactam, and others.

Preferably for ease of handling, the solvent is a liquid at or near room temperature.

As amply described in copending U.S. patent application Ser. No. 284,375, filed May 31, 1963, the incorporation of inorganic reinforcing agents into the polymerized product represents an important advance in the art. Although the present invention is quite useful in the production of unfilled polymeric shapes, it is particularly applicable in the manufacture of highly filled or reinforced polymers. This is so because of the increase in viscosity of a monomer slurry containing a solid phase and its consequent effect on thorough distribution of additives to the slurry. The term filler as used herein refers to any normally solid, nonpolymerizable substance which can be dispersed in a polymer. Although fillers can vary in shape from granular through acicular to fibrous, dispersion in a polymer will require that the filler be small enough to be encapsulated by the polymer matrix forming the finished object. For most purposes, it is desirable that the filler have a water solubility of 0.15 grams per liter or less. Examples include materials selected from a wide variety of clays such as montmorillonite, kaolinite, bentonite, hectorite, beidellite and attapulgite, other minerals and mineral salts such as chrysolite, alumina, saponite, hercynite, feldspar, quartz, wollastonite, mullite, kyanite, cristobalite, chrysotile, crocidolite, limestone, mica, spodumene and garnet, metals such as aluminum, tin, lead, magnesium, calcium, strontium, barium, titanium, zirconium, vanadium, chromium, manganese, iron, cobalt, nickel, copper, zinc, metal oxides such as oxides of the foregoing metals, metal salts such as ferric phosphate, mercuric phosphate, lead phosphate, ferric aluminate and zinc aluminate, siliceous non-mineral substances such as precipitated calcium carbonate, silica gel, fume silica, glass fibers, fibrous aluminum silicate of the formula $Al_2SiO_5$ and glass flakes, cellulosic materials such as wood chips, sawdust, wood flour, cotton fibers and cotton floc, other organic materials such as thermosetting and other thermoplastic polymers in granular or fibrous form, and miscellaneous materials such as graphite whiskers, carbon filaments, silicon crystals, silicon carbide and the like.

Those fillers set forth above which have or can acquire hydroxyl groups attached to their surfaces can be converted into reinforcing adducts by reaction with a coupling agent. A reinforcing adduct is therefore the reaction product of a filler with a coupling agent. A coupling agent has previously been defined as a polyfunctional compound having at least one functional group capable of reacting with hydroxyl groups and at least one functional group capable of chemically reacting with a polymerized polymer or polymerizing monomer. Fillers particularly preferred for conversion into reinforcing adducts are those siliceous materials characterized by a somewhat refractory nature with a melting point above 800° C., a Moh's hardness of at least 4, a water solubility of less than 0.1 gram per liter and a 3-dimensional crystal configuration as opposed to a 2-dimensional or planar crystal configuration possessed by some clays. Quantities of reinforcing adduct, their sizes and shapes, types and quantities of coupler and methods of combination with fillers to form reinforcing adducts are amply described in copending U.S. patent application Ser. No. 413,456, filed Nov. 24, 1964, hereby incorporated by reference. Also described are a number of other additives and techniques which can be used herein to prepare a polymeric shape of high quality, cast directly from a monomer.

The above invention will be more clearly understood in view of the following detailed examples. Quantities set forth below are expressed as parts or percent by weight unless otherwise stated.

EXAMPLE 1

To 225 grams of molten ε-caprolactam in an atmosphere of dry nitrogen is added 325 grams of wollastonite, 0.9 grams of methyl 11-trimethoxysilylundecanoate, 0.5 grams of water, 2.8 grams of an 80/20 mixture of 2,4- and 2,6-toluene diisocyanate (TD–80) and 0.02 grams of ethylenediamine (Dabco). The mixture is held at 120° C. and water, gaseous byproducts and caprolactam removed by stripping at a reduced pressure of about 6 mm. Hg. The stripping is continued until 50 grams of caprolactam are removed. The vacuum is released and replaced by a nitrogen blanket. The slurry is heated to 175° C., at which time 7.5 grams (10 mmoles/mole of caprolactam monomer) of magnesium caprolactam dissolved in N-methyl pyrrolidone is added with stirring. The slurry is cast into a mold preheated to 175° C. Total elapsed time to solidification (set time) is 50 minutes.

EXAMPLE 2

Example 1 is repeated exactly except that 5.2 grams of magnesium iodide is added to the monomer-inorganic slurry before 5.3 grams (7 mmoles/mole) of magnesium caprolactam solution is added. Set time is 10 minutes.

EXAMPLE 3

Example 1 is repeated exactly except that 2.8 grams (12 mmoles/mole) of magnesium bromide is added to the monomer-inorganic slurry before 5.3 grams (7 mmoles/mole) of magnesium caprolactam solution is added. Set time is 10 minutes.

EXAMPLE 4

Example 1 is repeated except that 2.4 grams (10 mmoles/mole) of acetyl caprolactam is used as an initiator in place of the diisocyanate initiator. Polymerization temperature is 200° C. The slurry does not set after two hours in the mold.

EXAMPLE 5

Example 4 is repeated exactly except that 2.8 grams (12 mmoles/mole) of magnesium bromide is added to the monomer slurry prior to addition of the magnesium caprolactam. Set time two minutes.

chloride and aluminum caprolactam, 14.6 grams (18 mmoles/mole) of magnesium bromide and a quantity of

TABLE I

| Composition No.: | Mg Capro Conc. in mmoles/ mole | Initiator Type | Conc., mmoles/ mole | MX$_2$ Type | Conc., mmoles/ mole | Poly. temp., °C. | Set Time, min. | Flex. Str., p.s.i. | Flex. Mod., p.s.i. | Impact ft. lb./ in. notch |
|---|---|---|---|---|---|---|---|---|---|---|
| 1 | 10 | TD-80 | 10 | None | | 175 | 50 | 7.8×10$^3$ | .56×10$^6$ | 0.50 |
| 2 | 7 | TD-80 | 10 | MgI$_2$ | 12 | 175 | 10 | 11.0 | .59 | 0.90 |
| 3 | 7 | TD-80 | 8 | MgBr$_2$ | 12 | 175 | 20 | 9.6 | .61 | 0.74 |
| 4 | 7 | Acetyl capro | 10 | None | | 200 | (1) | | | |
| 5 | 7 | ...do | 10 | NgBr$_2$ | 12 | 200 | 2 | 7.0 | .42 | 0.60 |

[1] Slurry did not set after two hours.

Flexural properties are determined in accordance with ASTM B-790, Procedure A, using a specimen ⅛ inch thick, ½ inch wide and 3 inches long. The span between supports on the testing machine is two inches. Crosshead motion is 0.11 inch per minute. All samples failed by tensile failure. Impact is measured in accordance with ASTM D-256, procedure A (Izod).

Comparison of Compositions 1 and 2 demonstrates both the exceptional and unexpected benefits which can be achieved by the practice of this invention. Not only is the polymerization time reduced to a fraction of its former requirements, but the mechanical properties of the finished polymer are improved significantly. Similar benefits are realized using other initiator systems such as the acetyl caprolactam of Compositions 4 and 5. Comparison of the mechanical properties of Compositions 4 and 5 is not possible since Composition 4 could not be converted into a finished polymerized object. Composition 3 demonstrates that the mechanical properties of a finished polymerized shape can be influenced by choice of the halogen source.

EXAMPLES 6 TO 16

The procedure described in Example 1 is followed except that 4.1 grams (15 mmoles per mole) of toluene diisocyanate (TD-80) is used, the magnesium caprolactam concentration is varied, and various halogen sources are added to the monomer slurry before addition of the magnesium caprolactam. Catalyst and halogenated compound concentrations are set forth in Table II.

TABLE II

| Composition No.: | Catalyst Conc., mmoles/ mole | Halogen Source Type | Conc. mmoles/ mole | Set Time, min. |
|---|---|---|---|---|
| 6 | 15 | MgCl$_2$ | 15 | 20 |
| 7 | 21 | AlCl$_3$ | 6 | 25 |
| 8 | 20 | MnCl$_2$ | 5 | 25 |
| 9 | 20 | SnCl$_2$ | 5 | 35 |
| 10 | 20 | NiCl$_2$ | 5 | 35 |
| 11 | 21 | C$_6$H$_5$COBr | 9 | <1 |
| 12 | 21 | C$_6$H$_5$COCl | 9 | 15 |
| 13 | 21 | C$_6$H$_5$CHCl$_2$ | 19 | 15 |
| 14 | 21 | C$_6$H$_5$CH$_2$Cl | 19 | 15 |
| 15 | 12 | CaCl$_2$ | 12 | 30 |
| 16 | 15 | NaCl | 15 | 15 |

The above compositions are prepared by polymerization of wollastonite-reinforced ε-caprolactam (65% by weight wollastonite) at 175° C., using magnesium caprolactam in the quantities indicated and 15 mmoles of toluene diisocyanate per mole of caprolactam monomer.

EXAMPLE 17

To quantity of 550 grams of molten ε-caprolactam in an atmosphere of dry nitrogen is added 8.0 grams of toluene diisocyanate (TD-80) and 0.1 gram of ethylenediamine (Dabco). The mixture is held at 135° C. and 50 grams of caprolactam is removed by stripping at a reduced pressure of 10 mm. Hg. The monomer temperature is raised to 175° C. and 8.8 grams (15 mmoles/mole) of aluminum trichloride is added with stirring. As the monomer is cast into molds preheated to 175° C., a quantity of aluminum caprolactam solution containing 66 mmoles of aluminum caprolactam (15 mmoles/mole) is metered into the monomer through a mixing head. Set time is 12 minutes.

EXAMPLE 18

Example 17 is repeated using, instead of aluminum trichloride, a quantity of zinc caprolactam solution containing 66 mmoles of zinc caprolactam (15 mmoles/mole). Set time is 15 minutes.

EXAMPLE 19

The specification points out that polymerization set times and mechanical properties of finished polymeric compositions are affected by the particular characteristics of individual batches of catalyst. As evidence of this phenomenon, a finished polymeric composition is prepared utilizing the procedure described in Example 1 except that 10 millimoles of sodium caprolactam is used together with 10 millimoles of toluene diisocyanate. Set time is 5 minutes.

The above procedure is repeated to prepare another polymeric composition, the only variation being the addition of 10 millimoles of magnesium chloride per mole of caprolactam monomer. The magnesium chloride is added to the monomer slurry prior to addition of the sodium caprolactam. Set time is 5 minutes.

Although set times are identical, the mechanical properties of the finished compositions vary considerably, the compositions prepared using the magnesium chloride addition being substantially stronger.

| | Flex. Str., p.s.i. | Flex. Mod., p.s.i. | Impact ft. lbs./in. notch |
|---|---|---|---|
| (a) | 4.4×10$^3$ | 0.44×10$^6$ | 0.6 |
| (b) | 10.0 | 0.50 | 1.2 |

EXAMPLE 20

In other instances the use of a halogenated compound in combination with a metal lactam can decrease substantially the required set time. For example, the procedure described in Example 4 followed except that 5 millimoles of calcium caprolactam is used in place of the magnesium caprolactam and only 6 millimoles of acetyl caprolactam is used in place of the 10 millimoles per mole. The slurry so prepared did not set over a 2 hour period. The above procedure is repeated exactly, the only modification being the addition of 10 millimoles of calcium bromide per mole of monomer prior to addition of the calcium caprolactam to the slurry. Set time is 2 minutes.

| | Flex. Stir., p.s.i. | Flex. Mod., p.s.i. | Impact, ft. lbs./in. notch |
|---|---|---|---|
| (a) | | | |
| (b) | 8.2×10$^3$ | 0.48×10$^6$ | 0.8 |

Examples 19 and 20 above demonstrate the various improvements possible using metal lactams wherein the metal component is more electropositive than magnesium. It should be understood, however, that such improvements will vary depending upon the particular characteristics of the catalyst system being used.

What is claimed is:

1. In the base-catalyzed, initiated, substantially anhydrous anionic polymerization of lactams, the improvement comprising forming an N-halometallic lactam catalyst by reacting in the presence of a lactam monomer from about 0.1 to about 200 millimoles per mole of lactam monomer of a metal lactam with from about 0.1 to about 200 millimoles per mole of lactam monomer of a metal halide wherein the metallic component of said metal halide is no more electropositive than the metal of said metal lactam, and catalyzing the polymerization of said monomeric lactam with said N-halometallic lactam.

2. A process according to claim 1 wherein the metal component of said N-halometallic lactam is magnesium or a metal less electropositive than magnesium.

3. A process according to claim 1 wherein said metal component is magnesium.

4. A process according to claim 1 wherein said metal halide is added to said monomeric lactam before said metal lactam is added.

5. A process according to claim 1 wherein said monomeric lactam is present in the form of a slurry of said lactam and a filler.

6. A process according to claim 1 wherein said monomeric lactam is present in the form of a slurry of said lactam and a reinforcing adduct.

7. A process according to claim 6 wherein said reinforcing adduct is made from a coupling agent and an inorganic siliceous material having a somewhat refractory nature with a melting point above 800° C., a Mohs hardness of at least 4, a water solubility of less than 0.1 gram per liter and a three-dimensional crystal configuration.

8. A process according to claim 1 wherein said monomeric lactam is a lactam of the formula

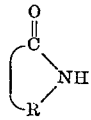

where R is an alkylene group having from about 5 to about 11 carbon atoms.

9. A process according to claim 1 wherein said monomeric lactam is ε-caprolactam.

10. A process according to claim 1 wherein said metal lactam is used in quantities ranging from about 1 to about 50 millimoles per mole of lactam monomer.

11. A process according to claim 1 wherein said metal lactam is used in quantities ranging from about 5 to about 30 millimoles per mole of lactam monomer.

12. A process according to claim 11 wherein the mole ratio of the metal halide to metal lactam is from about 0.75 to 1 up to 3 to 1.

13. A process according to claim 1 wherein said metal component is aluminum.

14. A process according to claim 1 wherein said metal component is calcium.

15. A process according to claim 1 wherein said metal component is zinc.

16. In the base-catalyzed, initiated, substantially anhydrous anionic polymerization of caprolactam, the improvement comprising
(a) forming an N-halometallic caprolactam by reacting in the presence of caprolactam monomer from about 1 to about 50 millimoles per mole of caprolactam of a metal caprolactam, the metal component of said metal caprolactam being magnesium or a metal less electropositive than magnesium, with a molar quantity approximately equal to the quantity of said metal caprolactam of a metal halide wherein the metallic component of said metal halide is no more electropositive than the metal of said metal lactam, and
(b) catalyzing the polymerization of a monomeric caprolactam with said N-halometallic caprolactam.

17. A process according to claim 16 wherein said halide is added to the monomeric caprolactam prior to addition of the metal caprolactam.

18. A process according to claim 17 wherein said monomeric caprolactam is present in the form of a slurry of said caprolactam and a reinforcing adduct.

References Cited

UNITED STATES PATENTS

| | | |
|---|---|---|
| 3,017,392 | 1/1962 | Butler et al. |
| 3,018,273 | 1/1962 | Butler et al. |
| 3,138,574 | 6/1964 | Kohan. |
| 3,216,976 | 11/1965 | Schwartz et al. |
| 3,227,675 | 1/1966 | Papalos. |
| 3,228,916 | 1/1966 | Pietrusza et al. |
| 3,309,343 | 3/1967 | Darnell et al. |
| 3,328,339 | 6/1967 | Tierney. |

FOREIGN PATENTS 1,332,806  6/1963  France.

MORRIS LIEBMAN, *Primary Examiner.*

H. S. KAPLAN, *Assistant Examiner.*

U.S. Cl. X.R.

260—78, 239.3